(12) United States Patent
Wallander et al.

(10) Patent No.: US 10,168,835 B2
(45) Date of Patent: *Jan. 1, 2019

(54) SPATIAL RESOLUTION IN TOUCH DISPLAYS

(71) Applicant: FlatFrog Laboratories AB, Lund (SE)

(72) Inventors: Mats Petter Wallander, Lund (SE); Håkan Bergström, Torna-Hällestad (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,653

(22) Filed: Mar. 19, 2018

(65) Prior Publication Data
US 2018/0210572 A1     Jul. 26, 2018

Related U.S. Application Data

(63) Continuation-in-part of application No. 15/453,246, filed on Mar. 8, 2017, now Pat. No. 10,001,881, (Continued)

(30) Foreign Application Priority Data

May 23, 2012   (SE) ........................ 1250520

(51) Int. Cl.
*G06F 3/042* (2006.01)
(52) U.S. Cl.
CPC .... *G06F 3/042* (2013.01); *G06F 2203/04104* (2013.01); *G06F 2203/04109* (2013.01)
(58) Field of Classification Search
CPC .................................................. G06F 3/0421
See application file for complete search history.

(56) References Cited

U.S. PATENT DOCUMENTS

| 3,440,426 A | 4/1969 | Bush |
| 3,553,680 A | 1/1971 | Cooreman |

(Continued)

FOREIGN PATENT DOCUMENTS

| CN | 201233592 Y | 5/2009 |
| CN | 101644854 A | 2/2010 |

(Continued)

OTHER PUBLICATIONS

Ahn, Y., et al., "A slim and wide multi-touch tabletop interface and its applications," BigComp2014, IEEE, 2014, in 6 pages.
(Continued)

*Primary Examiner* — Alexander Eisen
*Assistant Examiner* — Cory Almeida
(74) *Attorney, Agent, or Firm* — Knobbe, Martens, Olson & Bear, LLP

(57) ABSTRACT

A touch-sensitive apparatus comprises a first subset of components on a first end of the touch surface, and a second subset of components on a second end which is opposite to and parallel with the first end. The components include emitters and detectors, each emitter being operable for propagating a diverging energy beam (e.g. radiation) across the touch surface inside the panel, and each detector being operable for detecting transmitted energy from at least two emitters. The components in at least one of the first and second subsets are systematically arranged in spatially separate groups along at least one of the first and second ends, so as to achieve a reduced spacing and/or an increased uniformity of the transmission paths along a center line between the first and second ends compared to an equidistant arrangement of all components.

20 Claims, 9 Drawing Sheets

Related U.S. Application Data which is a continuation of application No. 14/402,519, filed as application No. PCT/SE2013/050585 on May 22, 2013, now Pat. No. 9,626,040.

(60) Provisional application No. 61/650,618, filed on May 23, 2012.

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,539,514 A | 7/1996 | Shishido et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |

(56) References Cited

U.S. PATENT DOCUMENTS

| | | |
|---|---|---|
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |

(56) References Cited

U.S. PATENT DOCUMENTS

| | | |
|---|---|---|
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0115748 A1* | 5/2011 | Xu .................. G06F 3/0421 345/175 |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1* | 9/2011 | Fahraeus .................. G06F 3/0421 345/175 |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |

(56) References Cited

U.S. PATENT DOCUMENTS

| | | |
|---|---|---|
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1 | 6/2013 | Holmgren et al. |
| 2013/0158504 A1 | 6/2013 | Ruchti et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0139467 A1 | 5/2014 | Ghosh et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0271481 A1 | 9/2015 | Guthrie et al. |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0154532 A1 | 6/2016 | Campbell |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |

(56) References Cited

FOREIGN PATENT DOCUMENTS

| | | |
|---|---|---|
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

Johnson, M., "Enhanced Optical Touch Input Panel", IBM Technical Discolusre Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/~joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

\* cited by examiner

SPATIAL RESOLUTION IN TOUCH DISPLAYS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Technical Field

The present invention relates to a touch-sensitive apparatus that operates by propagating energy beams across a touch surface of a panel.

Background Art

Touch-sensitive apparatus known in the art may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in U.S. Pat. No. 3,673,327, U.S. Pat. No. 4,254,333 and US2006/0114237, the emitters and detectors are arranged in rows on opposite ends of the panel, and the light is propagated between opposite pairs of emitters and detectors so as to define a rectangular grid of propagation paths.

As an alternative, U.S. Pat. No. 7,432,893 proposes the use of a few large emitters arranged at the corners of the panel, or centrally on each end of the panel, to inject diverging light beams ("fan beams") into the panel for receipt by arrays of detectors along all ends of the panel. This configuration may enable an increased spatial resolution for a given number of emitters and detectors, by increasing the density of the grid of propagation paths. The spatial resolution indicates the smallest object that can be detected by the touch-sensitive apparatus at a given location on the touch surface.

In an alternative configuration, e.g. disclosed in WO2009/077962, US2011/0234537, US2011/0157096, rows of regularly spaced fan beam emitters and detectors, respectively, are arranged on opposite ends of the panel to define a dense grid of propagation paths across the touch surface.

WO2010/064983 discloses further alternative configurations. In one configuration, which is intended to improve the uniformity of the grid of propagation paths, fan beam emitters and detectors are alternated with equal spacing around the periphery of the touch surface. In another configuration, which is intended to reduce interference phenomena that may occur when different emitters concurrently inject light of the same wavelength into the panel, fan beam emitters and detectors are arranged with randomized spacing around the periphery of the touch surface.

US 2009/0153519 discloses providing alternating emitter and detector ports around the panel. Alternatively, a unique electrode can serve both purposes of emitter and receiver.

There is a continued desire to improve the spatial resolution with respect to the uniformity of the spatial resolution across the touch surface or the minimum detectable object size at a given position on the touch surface of a touch-sensitive apparatus.

SUMMARY

It is an objective of the invention to at least partly overcome one or more limitations of the prior art.

An objective is to enable an improved spatial resolution for a given number of electro-optical components in a touch-sensitive apparatus that operates by propagating energy beams across a touch surface. One or more of these objectives, as well as further objectives that may appear from the description below, are at least partly achieved by means of a touch-sensitive apparatus according to the independent claims, embodiments thereof being defined by the dependent claims.

One aspect of the invention is a touch-sensitive apparatus, comprising a panel defining a touch surface, a first subset of components on a first end of the touch surface, a second subset of components on a second end of the touch surface, wherein the components comprise emitters and detectors, the emitters being operable for propagating diverging light beams across the touch surface, and the detectors being operable for detecting transmitted light from the emitters, wherein the components in at least one of the first and second subsets are systematically arranged in spatially separate groups along at least one of the first and second ends, wherein each group comprises at least two components, wherein said at least one of the first and second subsets have an inter-group spacing between the groups and an intra-group spacing between the components within each group, and wherein the groups in said at least one of the first and second subsets have systematically varying inter-group spacing and systematically varying intra-group spacing.

This aspect is based on the insight that conventional configurations that propagate diverging energy beams and have first and second subsets of equispaced components on opposite first and second ends of the touch surface will result in a convergence of the propagation paths towards the center line between the opposite subsets. Thereby, the grid of propagation paths will exhibit increased gaps without propagation paths near the center line, which is equal to a locally reduced spatial resolution. By arranging the components in at least one of the first and second subsets in spatially separate groups along at least one of the first and second ends, and with the groups in said at least one of the first and second subsets have systematically varying inter-group spacing and systematically varying intra-group spacing, the convergence of the propagation paths may be avoided or reduced and the propagation paths may be more distributed along the center line. By proper design of the groups, the first aspect thus provides an increased uniformity and/or a reduced spacing of propagation paths, at least near the center line, for a given number of components, compared to an equidistant arrangement of the components in the first and second subsets.

It should be noted that the components are systematically arranged in spatially separate groups, which indicates that the center-to-center spacing between adjacent components in different groups is larger than the center-to-center spacing between adjacent components within each group. The center-to-center spacing may also be denoted a "pitch". The systematic arrangement in groups is contrasted by a randomized arrangement, which generally does not result in any ordered or systematic grouping of components. The arrangement of the components into spaced-apart groups may be systematic in different respects, e.g. by having the same number of components in all groups in a subset, by having the same combination of components within all groups in a subset, or by having the same ordering of components within all groups in a subset.

In one embodiment, all groups include the same number of components, e.g. two or three components. This may facilitate the design and manufacture of the apparatus.

In one embodiment, each of the first and second subsets contains an alternating sequence of emitters and detectors.

In one embodiment, the components in both the first subset and the second subset are systematically arranged in spatially separate groups along the first and second ends. For example, the groups in the first subset may consist of a sequence of one emitter and one detector with respect to a reference direction along the first and second ends, and the groups in the second subset may consist of a sequence of one detector and one emitter with respect to the reference direction.

In another embodiment, the first subset contains only emitters and the second subset contains only detectors.

In one embodiment, said at least one of the first and second subsets have an inter-group spacing between the groups and an intra-group spacing between the components within each group, such that a ratio of the inter-group spacing to the intra-group spacing is greater than 1.2, and possibly in the range of 1.3-8. In yet another embodiment, the groups in said at least one of the first and second subsets have systematically varying inter-group spacing and systematically varying intra-group spacing. The use of varying inter-group and/or intra-group spacing may serve to further reduce the spacing of propagation paths along the center line.

In one embodiment, the first and second subsets define a grid of transmission paths between the emitters and the detectors, wherein the groups are systematically arranged so as to generate a decreased spacing of transmission paths along a center line between the first and second ends compared to an equidistant arrangement of the components in the first and second subsets. Such an embodiment may serve to increase the spatial resolution of the touch-sensitive apparatus for a given number of components.

In one embodiment, the first and second subsets define transmission paths between the emitters and the detectors, said transmission paths forming intersection points with a center line between first and second ends, wherein the groups are systematically arranged so as to generate a decreased average number of transmission paths per intersection point compared to an equidistant arrangement of the components in the first and second subsets. Such an embodiment may serve to reduce the impact of the individual intersections on the transmitted energy measured by individual detectors, and thereby reduce a difference in touch sensitivity along the center line in relation to other parts of the touch surface. This has been found to reduce the occurrence of artifacts caused by systematic errors and noise when using certain image reconstruction algorithms for reconstructing a two-dimensional distribution of interaction or "attenuation" across the touch surface based on the transmitted energy detected by the detectors.

In one embodiment, the components are electro-optical components that are configured to generate radiation and detect radiation, respectively.

In one embodiment, the panel defines a front surface and a back surface, wherein the emitters are operable for propagation of diverging beams of radiation by internal reflections in the front and back surfaces, and wherein the front surface comprises the touch surface and is configured to allow the diverging beams of radiation to be attenuated by objects in contact with the touch surface. The back surface may be an external or internal surface of the panel.

In one embodiment, a ratio of the inter-group spacing to the intra-group spacing is 1.33.

In one embodiment, the intra-group spacing in at least one group, in at least one of the first and second subsets, is in the range 0.25-5 mm.

In one embodiment, at least one emitter and one detector, in at least one of the first and second subsets, are arranged as a component pair having an intra-group spacing corresponding substantially to the sum of half the width of said one emitter and half the width of said one detector.

In one embodiment, at least one of the first and second subsets comprises a plurality of said component pairs arranged at defined intervals along the first and/or second end.

In one embodiment, the components within a group are separated with least two different intra-group spacings.

In one embodiment, each detector within a group is separated by different intra-group spacings from at least two emitters in the same group.

In one embodiment, the groups comprise interleaved pairs of detectors and emitters, and wherein, for at least a first group, a detector of at least one detector pair and an emitter of at least one emitter pair are arranged as a component pair having an intra-group spacing corresponding substantially to the sum of half the width of said one emitter and half the width of said one detector.

In one embodiment, the panel is rectangular with horizontal and vertical rows of said components, wherein the components are systematically arranged in spatially separate groups in both the horizontal and vertical rows.

In one embodiment, the inter-group spacing on the first end is different from the inter-group spacing on the second end.

In one embodiment, the intra-group spacing on the first end is different from the intra-group spacing on the second end.

In one embodiment, the number of components in each group on the first end is different from the number of components in each group on the second end.

Still other objectives, features, aspects and advantages of the present invention will appear from the following detailed description, from the attached claims as well as from the drawings.

BRIEF DESCRIPTION OF THE DRAWINGS

Examples of the disclosure will now be described in more detail with reference to the accompanying schematic drawings.

DETAILED DESCRIPTION OF EXAMPLE EMBODIMENTS

Figure 1A:
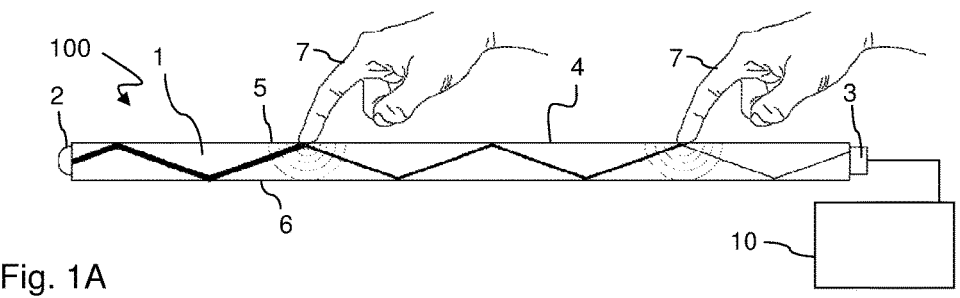
FIGS. 1A-1B are section and top plan views of an optical touch-sensitive apparatus.

In the following, examples of the present invention will be given in relation to a touch-sensitive apparatus designed to operate by light transmission. Throughout the description, the same reference numerals are used to identify corresponding elements.

Figure 1B:
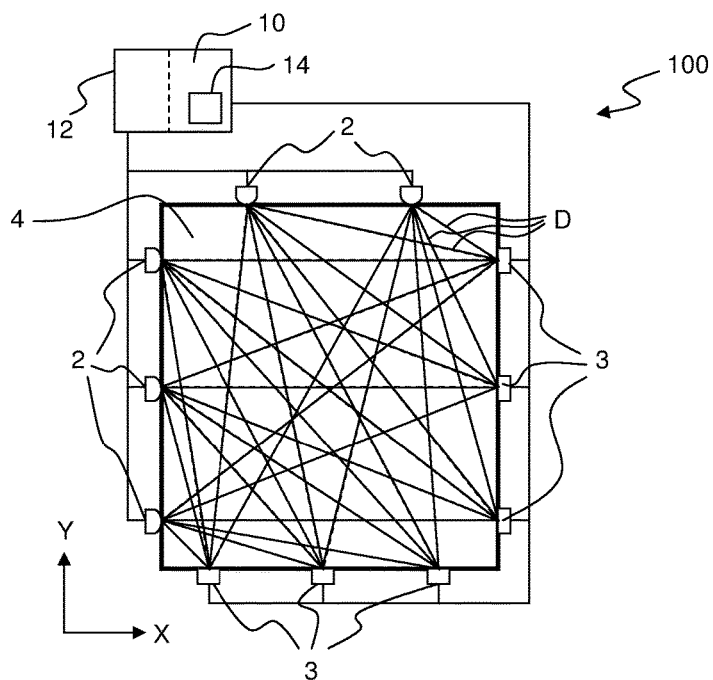

FIGS. 1A-1B illustrate an example of a touch-sensitive apparatus 100 that is based on the concept of FTIR (Frustrated Total Internal Reflection). The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. Each light sheet is formed as a beam of light that expands (as a "fan beam") in the plane of the panel 1 while propagating in the panel 1 from a respective incoupling region/point on the panel 1. The detectors 3 are distributed along the perimeter of the touch surface 4 to receive the light from the emitters 2 at a number of spaced-apart outcoupling regions/points on the panel 1. It should be understood that the incoupling and outcoupling regions/points merely refer to the positions where the beams enter and leave, respectively, the panel 1. The light from each emitter 2 will propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thereby, the emitters 2 and detectors 3 collectively define a grid of detection lines D ("detection grid") on the touch surface 4. The spacing of intersections in the detection grid defines the spatial resolution of the apparatus 100, i.e. the smallest object than can be detected on the touch surface 4.

The detectors 3 collectively provide an output signal, which is received and sampled by a signal processor 10. The output signal contains a number of sub-signals, also denoted "projection signals", each representing the energy of light emitted by a certain light emitter 2 and received by a certain light detector 3. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

The signal processor 10 may be configured to process the projection signals so as to determine a property of the touching objects, such as a position (e.g. in the x,y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013062471, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of a touch-sensitive apparatus. For example, instead of injecting and detecting light via the edge surface that connects the boundary surfaces 5, 6, light may be coupled into and/or out of the panel 1 via the top and/or bottom surfaces 5, 6, e.g. by the use of dedicated coupling elements attached to the panel 1. It is also conceivable that the light is coupled into and out of the panel 1 through different portions of the panel, e.g. via the boundary surface 5 and the boundary surface 6, respectively. Examples of alternative FTIR-based touch systems are e.g. disclosed in U.S. Pat. No. 7,432,893, WO2010/046539, WO2012105893, and PCT/SE2012/051368 filed on Dec. 10, 2012, which are all incorporated herein by this reference.

Embodiments of the invention apply a systematic grouping of the emitters and detectors along the perimeter of the touch surface 4 to achieve desired properties of the detection grid on the touch surface 4, as will be further explained in relation to the top plan views in FIGS. 3A-3H. Each of FIGS. 3A-3H illustrates a grid of detection lines that are defined between rows of emitters (open circles) and detectors (open squares) on opposite ends or sides of a touch surface (not shown). A dotted line indicates the center line C between the rows of emitters and detectors, and small dots indicate the intersections of the detection lines with the center line C. For ease of presentation, the panel 1 has been omitted in FIGS. 3A-3H.

Figure 3A:
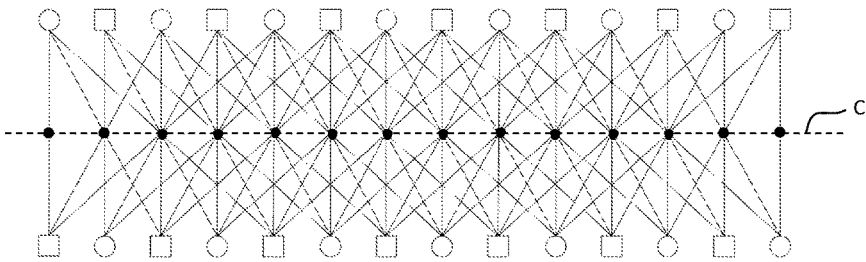
FIG. 3A illustrate a grid of detection lines in a prior art apparatus with interleaved emitters and detectors.

In a conventional fan beam arrangement, denoted "interleaved arrangement" herein and shown in FIG. 3A, emitters and detectors are arranged in alternating fashion with equal spacing in two rows along opposite ends of the touch surface. The interleaved arrangement results in a symmetric detection grid, and each intersection point on the center line C contains a large number of detection lines. As shown, the maximum spacing of intersections in the detection grid occurs on the center line C. In other words, the center line C defines the spatial resolution of the grid of detection lines that extend between the rows of alternating emitters and detectors.

Figure 3B:
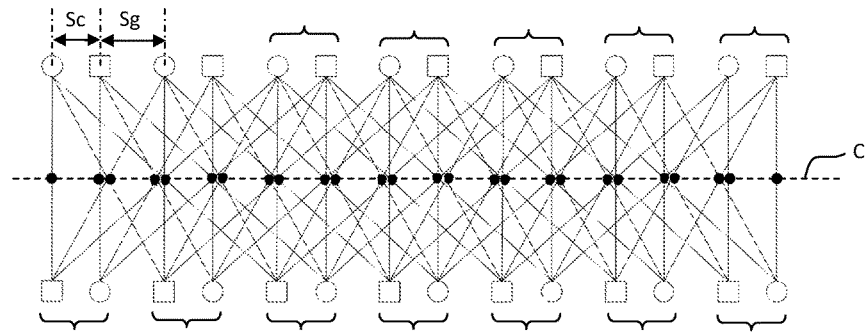
FIGS. 3B-3H illustrate the grid of detection lines when the apparatus in FIG. 3A is designed in accordance with examples of the disclosure.

In a first example, shown in FIG. 3B, the alternating emitters and detectors are arranged in groups (indicated by brackets) consisting of one emitter and one detector, where the order of components in the groups is "reversed" between the upper and lower rows, since the upper row consists of emitter-detector-groups, whereas the lower row consists of detector-emitter-groups, as seen in a direction from left to right. Within each of these groups, the emitter and detector are spaced by an intra-group spacing $S_c$, and the different groups are spaced by an inter-group spacing $S_g$. The components are arranged with equal $S_c$ within all groups and with equal $S_g$ between all groups. In the illustrated example, $S_g/S_c=1.33$.

Figure 2:
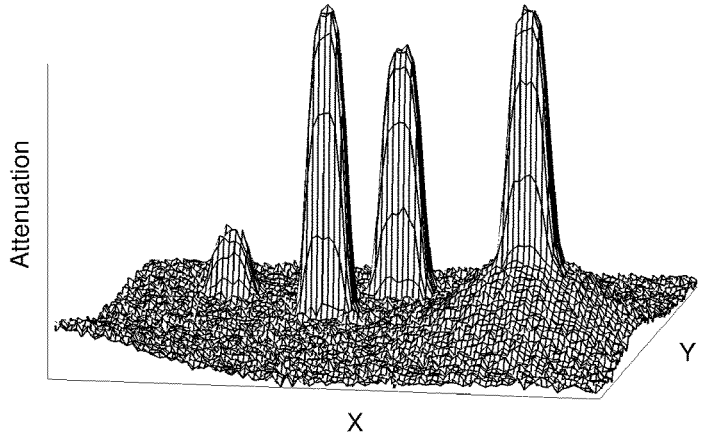
FIG. 2 is a 3D plot of an attenuation pattern generated based on energy signals from an optical touch-sensitive apparatus.

By comparing FIG. 3B and FIG. 3A, it is realized that the systematic grouping of components results in a doubled number of intersection points on the center line C. This means that the spatial resolution of the touch-sensitive apparatus is increased without increasing the number of components per unit length in the opposite rows. Thus, embodiments of the invention make it possible to attain a higher spatial resolution for a given number of electro-optical components (emitters and detectors). The grouping of components may be seen as leading to a separation of intersection points that overlap in the conventional fan beam arrangement of FIG. 3A. It is currently believed that a useful separation is achieved when $S_g/S_c$ exceeds about 1.2-1.3. Thereby, the grouping also results in a reduction, on average, in the number of detection lines that meet at each intersection point on the center line C. In the example of FIG. 3A, 5 detection lines meet at the intersection points on the center line C. In the example of FIG. 3B, 3 or 2 detection lines meet at each intersection point on the center line C. This has been found to enable a suppression of artifacts that may otherwise arise when the attenuation pattern is reconstructed using image reconstruction algorithms, e.g. algorithms for Filtered Back Projection. With the conventional fan beam arrangement in FIG. 3A, a larger number of projection signals are generally affected by objects that touch the intersection points on the center line C than by objects that touch the intersection points outside the center line C, since a touch on the center line C affects many more detection lines. Thereby, the image reconstruction algorithm may inherently overemphasize regions near the center line, resulting in a locally increased sensitivity and a risk of enhancing noise and systematic errors in this region. Any such tendency is suppressed or at least reduced in the embodiment in FIG. 3B.

It should be noted that this advantageous effect is far from intuitive for the skilled person who is familiar with another class of optical touch systems, in which light is propagated in the free air above the touch surface and in which the location of touching objects is determined by detecting that the light paths across the touch surface are interrupted or blocked by the touching object. This class of optical touch systems is e.g. known from U.S. Pat. No. 6,690,363, U.S. Pat. No. 6,429,857, U.S. Pat. No. 7,042,444, US2010/0066016, U.S. Pat. No. 7,855,716, WO2010/081702 and WO2010/112404. As explained in WO2010/112404, to enable multi-touch determination of n−1 objects in simultaneous contact with a touch surface, each point on the touch surface needs to be passed by n different light paths. Thus, the general teaching is here that the emitters and detectors should be configured and arranged so as to maximize the number of intersecting propagation paths across the detection grid. In contrast, embodiments of the invention generally aim at reducing, on average, the number of intersecting propagation paths.

Figure 3C:
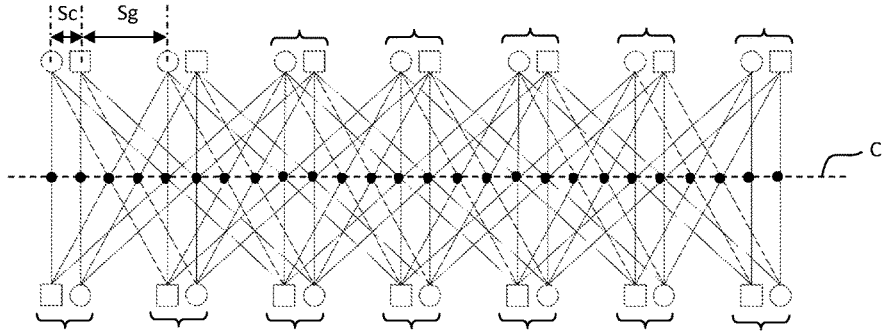

The arrangement in FIG. 3C is similar to the arrangement in FIG. 3B, but is designed with $S_g/S_c=3$, which results in a uniform spacing of intersection points on the center line C. This may or may not be a desired feature of the touch-sensitive apparatus, depending on implementation.

Figure 3D:
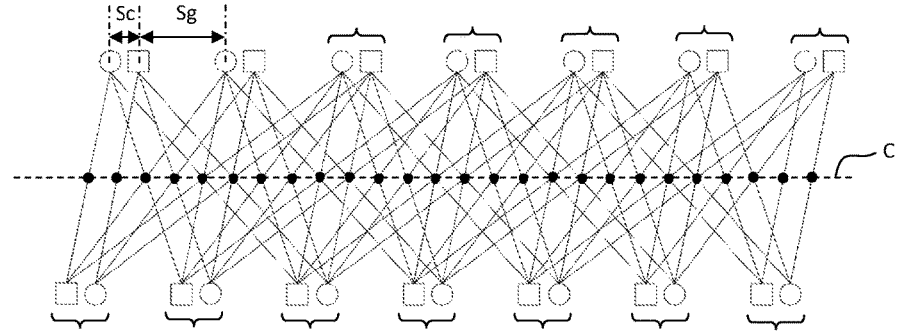

FIG. 3D is identical to FIG. 3C except for a relative displacement between the upper and lower rows. As seen, the spacing of intersection points on the center line C is the same as in FIG. 3C.

Figure 3E:
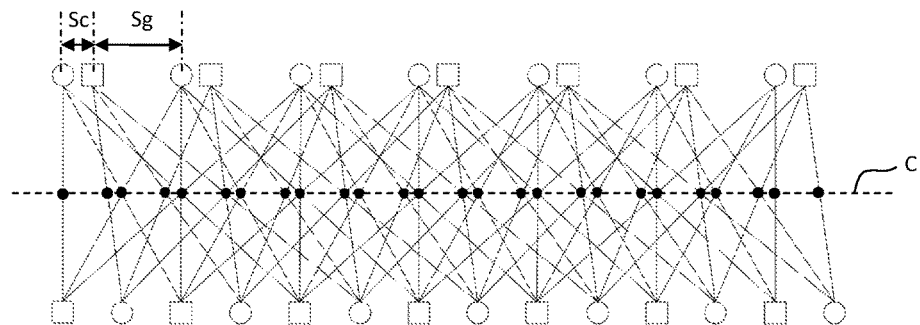

FIG. 3E illustrates a variant in which only the components in the upper row are arranged in groups. In the illustrated example, $S_g/S_c=3$. As seen, this also results in a doubled number of intersection points on the center line C compared to the conventional arrangement in FIG. 3A.

Figure 3F:
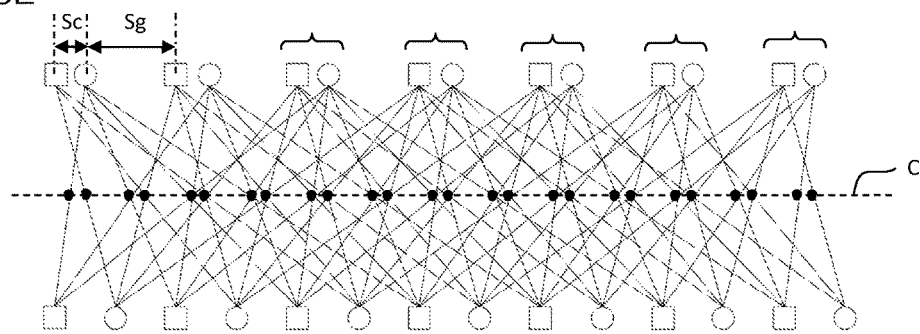

FIG. 3F illustrates a variant of the embodiment in FIG. 3E, with a different order of components within the groups in the upper row, i.e. detector-emitter-groups instead of emitter-detector groups as seen in a direction from left to right. The distribution of intersection points on the center line C is similar to the one in FIG. 3E.

Figure 3G:
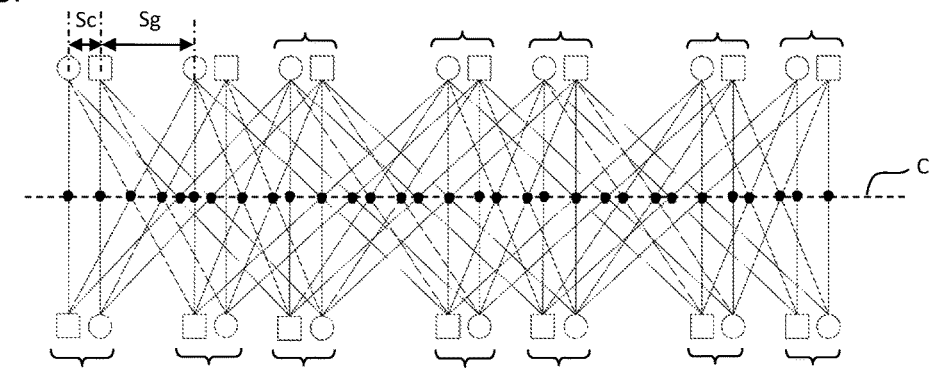

In a second embodiment, shown in FIG. 3G, the emitters and detectors are arranged in groups with identical intra-group spacing $S_g$ and with systematically varied inter-group spacing $S_c$. In the illustrated example, $S_g$ is alternately set to $25_c$ and $45_c$. As seen, this results in a varied spacing of intersection points on the center line C, which may or may not be a desirable feature. Furthermore, compared to the arrangements in FIGS. 3B-3D, the average number of detection lines at the intersection points on the center line C is reduced. In the example of FIG. 3G, there are 1 or 2 detection lines at each intersection point with the center line C. In a variant, not shown, the emitters and detectors may be arranged in groups with identical inter-group spacing $S_c$ and with systematically varied intra-group spacing $S_g$.

Figure 3H:
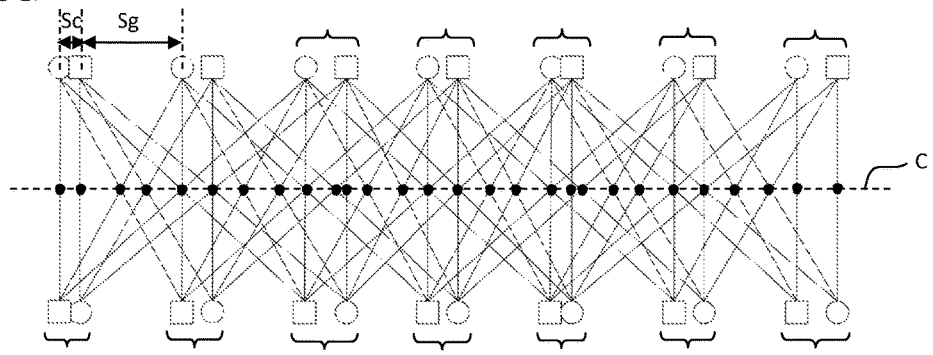

In a third embodiment, shown in FIG. 3H, the emitters and detectors are arranged in groups with systematically varied inter- and intra-group spacings $S_c$, $S_g$. In the illustrated example, $S_c$ iterates over the sequence: [$0.67S_c$, $S_c$, $1.33S_c$, $S_c$] from left to right along each of the rows, whereas $S_g$ iterates over the sequence: [$3.33S_c$, $3S_c$, 2.67, $3S_c$] from left to right along each of the rows. This is seen to result in a relatively uniform distribution of intersection points on the center line C, with 1 or 2 detection lines at each intersection point with the center line C.

Figure 4A:
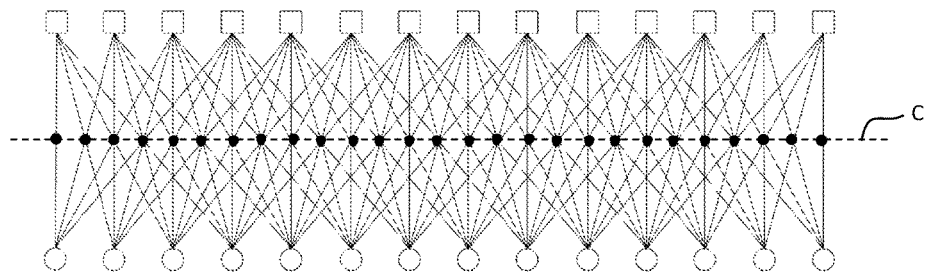
FIG. 4A illustrate a grid of detection lines in a prior art apparatus with separated emitter and detector sides.

Another conventional fan beam arrangement, denoted "non-interleaved arrangement" herein, is shown in FIG. 4A, in which the emitters are arranged with equal spacing on one end of the touch surface and the detectors are arranged with equal spacing on the opposite end. The non-interleaved arrangement results in a symmetric detection grid, and each intersection point on the center line C contains a large number of detection lines.

Figure 4B:
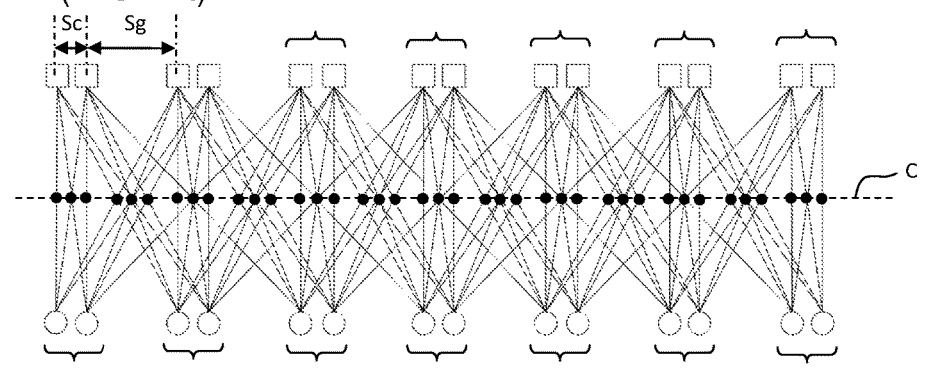
FIGS. 4B-4D illustrate the grid of detection lines when the apparatus in FIG. 4A is designed in accordance with examples of the disclosure.

The arrangement in FIG. 4A may be modified by systematically grouping the emitters and detectors in the same way as described in relation to FIGS. 3B-3H. As an example, FIG. 4B illustrates the result of grouping the detectors in the upper row and the emitters in the lower row two-by-two. In the illustrated example, $S_g/S_c=3$. As seen, the number of detection lines at the intersection points on the center line C is reduced from 4 detection lines per intersection point in FIG. 4A to either 1, 2 or 4 detection lines per intersection point in FIG. 4B. Thus, the example in FIG. 4B may serve to reduce the occurrence of the above-mentioned artifacts in the reconstructed attenuation pattern.

Figure 4C:
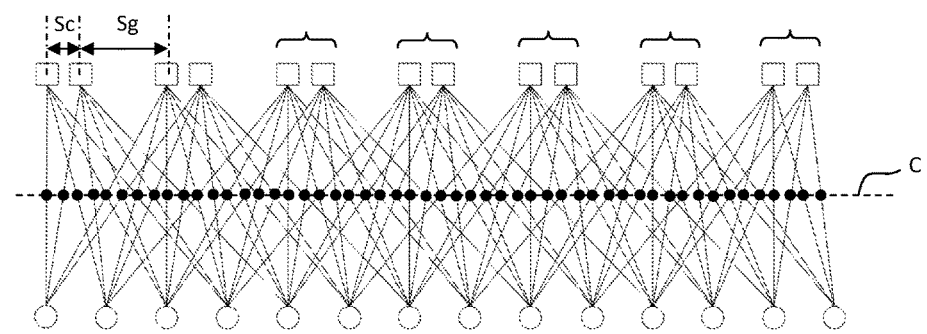

FIG. 4C illustrates the result of grouping only the detectors in the upper row two-by-two, using $S_g/S_c=3$. As seen, the result is a significantly decreased spacing of intersection points on the center line C, with 1 or 2 detection lines per intersection point. Furthermore, the intersection points are essentially uniformly spaced on the center line C, which may be a desirable feature. A similar result is obtained by grouping only the emitters in the lower row two-by-two.

Figure 4D:
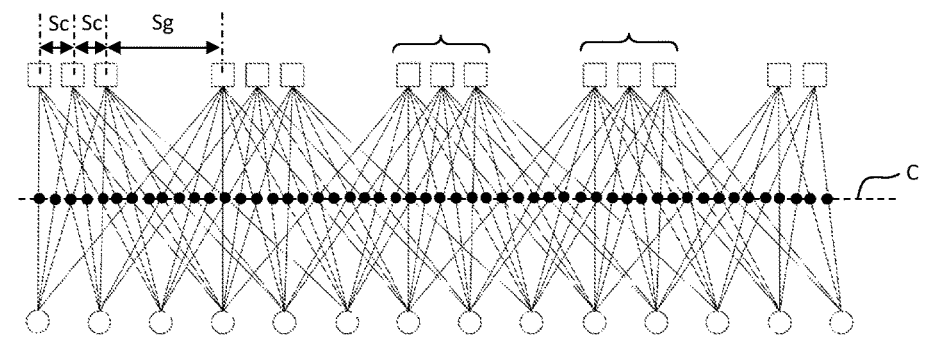

It is realized that the groups in all of the foregoing embodiments may contain more than two components. FIG. 4D illustrates a variant in which the detectors in the upper row are grouped three-by-three. As seen, the distributions of intersection points on the center line C is similar to the one in FIG. 4C.

Figure 5A:
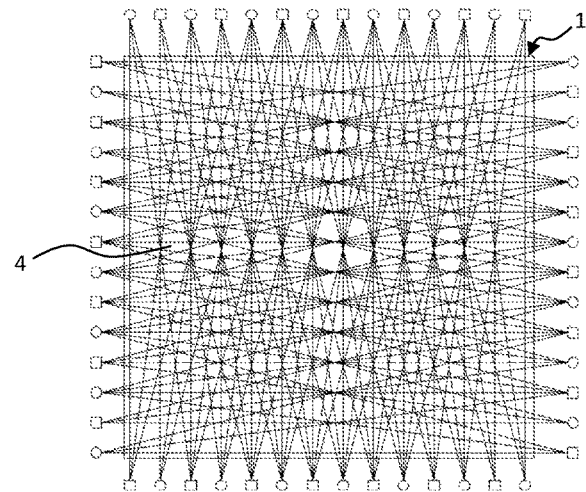
FIG. 5A illustrate a grid of detection lines in a prior art apparatus with two orthogonal sub-grids.
Figure 5B:
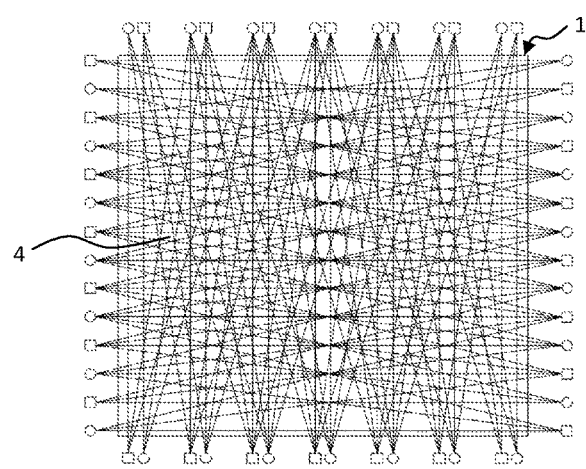
FIGS. 5B and 5C illustrate a corresponding grid of detection lines when the apparatus is designed in accordance with examples of the disclosure.
Figure 5C:
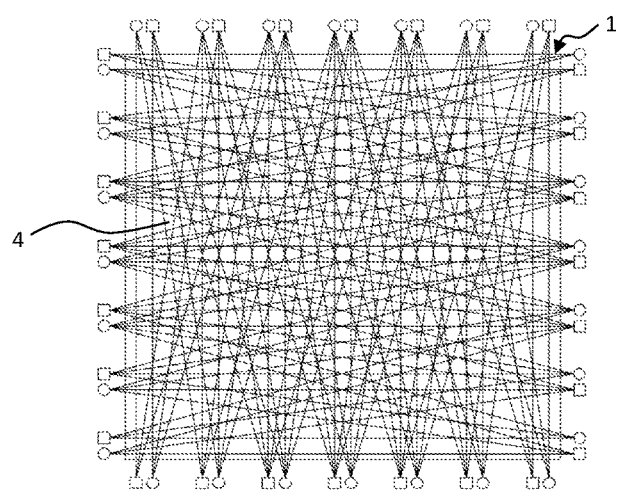

FIG. 5A is a top plan view of a rectangular panel 1 which is surrounded on four sides by horizontal and vertical rows of fan beam emitters and detectors which are conventionally arranged in alternating fashion with equal spacing. The horizontal rows define a first sub-grid, and the vertical rows define a second sub-grid. The first and second sub-grids overlap to define combined detection grid. As seen, the conventional arrangement results in horizontal and vertical bands of reduced spatial resolution along the center lines between the opposing rows of components. FIG. 5B illustrates a touch-sensitive apparatus with a conventional fan beam arrangement in the vertical rows and a grouping according to the first embodiment (FIG. 3C) in the horizontal rows. Compared to FIG. 5A, the horizontal bands are significantly suppressed. FIG. 5C illustrates a touch-sensitive apparatus with groupings according to the first embodiment (FIG. 3C) in both the vertical and horizontal rows. Compared to FIG. 5A, both the vertical and the horizontal bands are significantly suppressed. It should be noted that FIGS. 5A-5C omit a further sub-grid, which is defined between the pairs of horizontal and vertical rows.

Figure 9A:
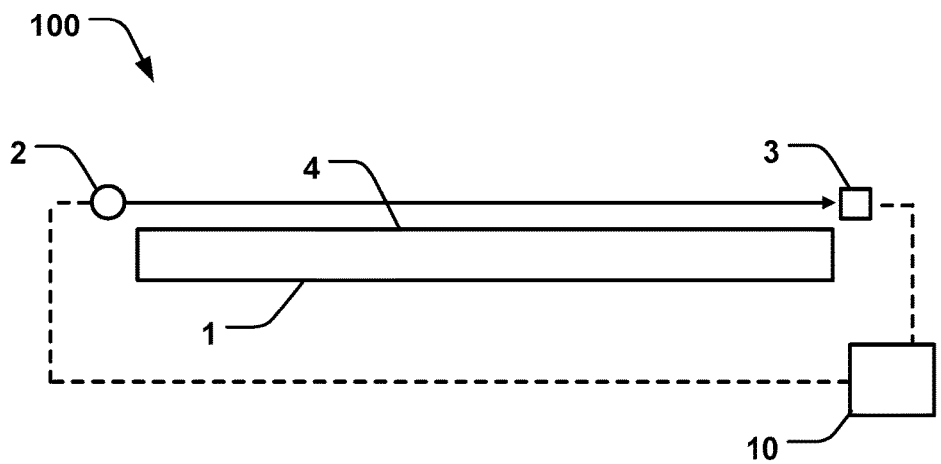
FIGS. 9a-b are schematic illustrations of a touch-sensitive apparatus with light propagation paths above the touch surface according to examples of the disclosure.
Figure 9B:
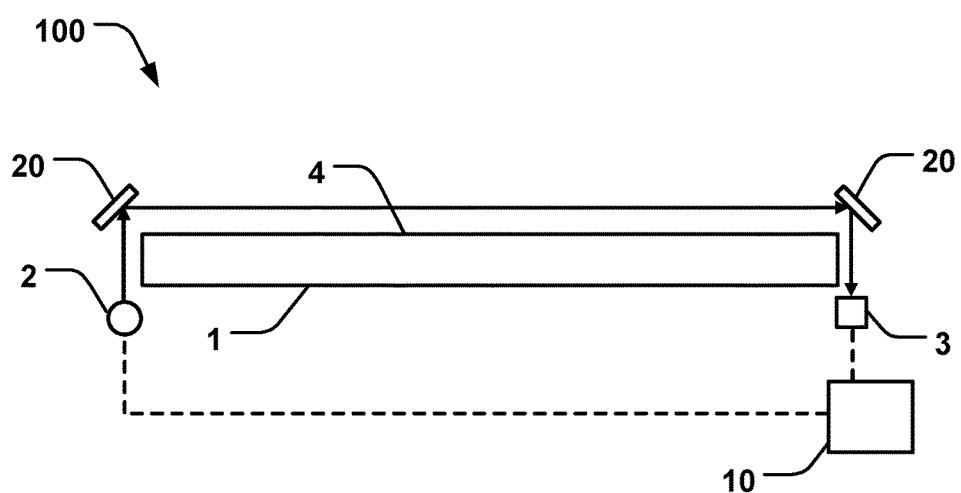

Although the touch-sensitive apparatus 100 has been described in some examples of this disclosure as having a panel 1 in which the light is transmitted, between the emitters and detectors, is should be understood that such light transmission can also be provided outside the panel 1. For example, as schematically illustrated in FIGS. 9a-b, the light path between the emitters 2 and the detectors propagate above the touch surface 4. In FIG. 9a, the emitters 2 and the detectors 3 are arranged above the touch surface 4, while being arranged below the touch surface 4 in FIG. 9b. In the latter case, the light path still propagates above the touch surface 4 by being deflected by reflective elements 20 arranged along the sides of the touch surface 4. The touch-sensitive apparatus 100 comprises a signal processor 10 as described in relation to FIGS. 1a-b, and touch detection is achieved as described previously. Thus, for all example embodiments described in this disclosure, the emitters 2 and detectors 3 may be arranged as schematically illustrated in any of FIGS. 1a and 9a-b.

Figure 6A:
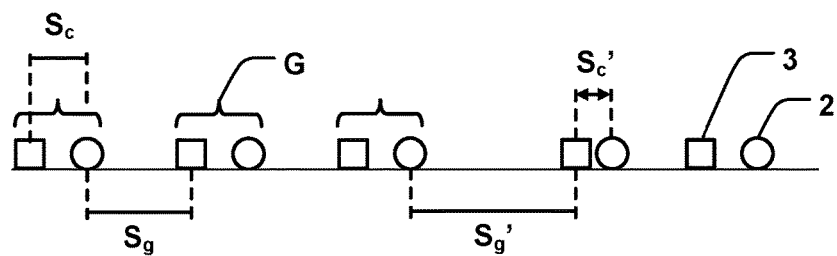
FIG. 6a is a schematic illustration of at least a part of a subset of components with varying inter- and intra-group distances, according to an example of the disclosure.
Figure 6B:
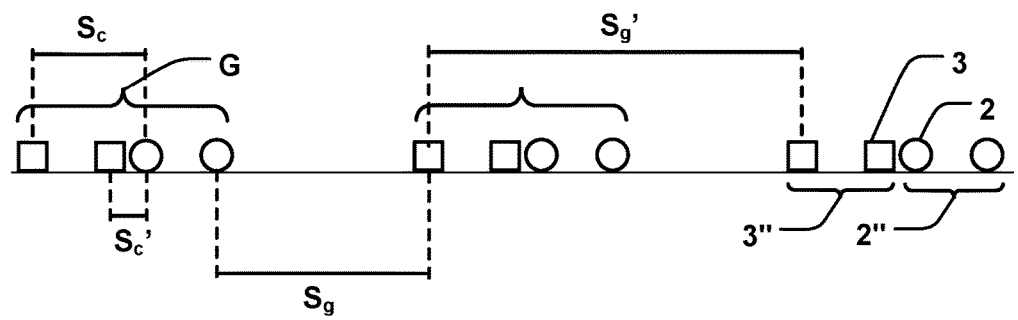
FIG. 6b is another schematic illustration of at least a part of a subset of components with varying inter- and intra-group distances, according to an example of the disclosure.

FIG. 6a shows a schematic example of components arranged with varying inter- ($S_g$) and intra-group ($S_c$) distances along at least part of an end of a touch surface 4. Hence, the touch-sensitive apparatus 100 may comprise a panel 1 defining a touch surface 4, a first subset of components 2, 3, on a first end of the touch surface 4, a second subset of components 2, 3, on a second end of the touch surface 4, wherein the components comprise emitters 2 and detectors 3. The emitters 2 are being operable for propagating diverging light beams across the touch surface 4, e.g. above the touch surface 4 as shown in FIGS. 9a-b, and the detectors 3 are being operable for detecting the transmitted light from the emitters 2. The components 2, 3, in at least one of the first and second subsets are systematically arranged in spatially separate groups (G) along at least one of the first and second ends. Each group comprises at least two components, as shown in FIGS. 6a-b. At least one of the first and second subsets have an inter-group spacing ($S_g$) between the groups and an intra-group spacing ($S_c$) between the components within each group. The groups in said at least one of the first and second subsets have systematically varying inter-group ($S_g$) spacing and systematically varying intra-group spacing ($S_c$). This is schematically illustrated in FIGS. 6a-b by the different lengths of inter-group spacings $S_g$ and $S_g'$, as well as the different lengths of intra-group spacings $S_c$ and $S_c'$.

Figure 7:
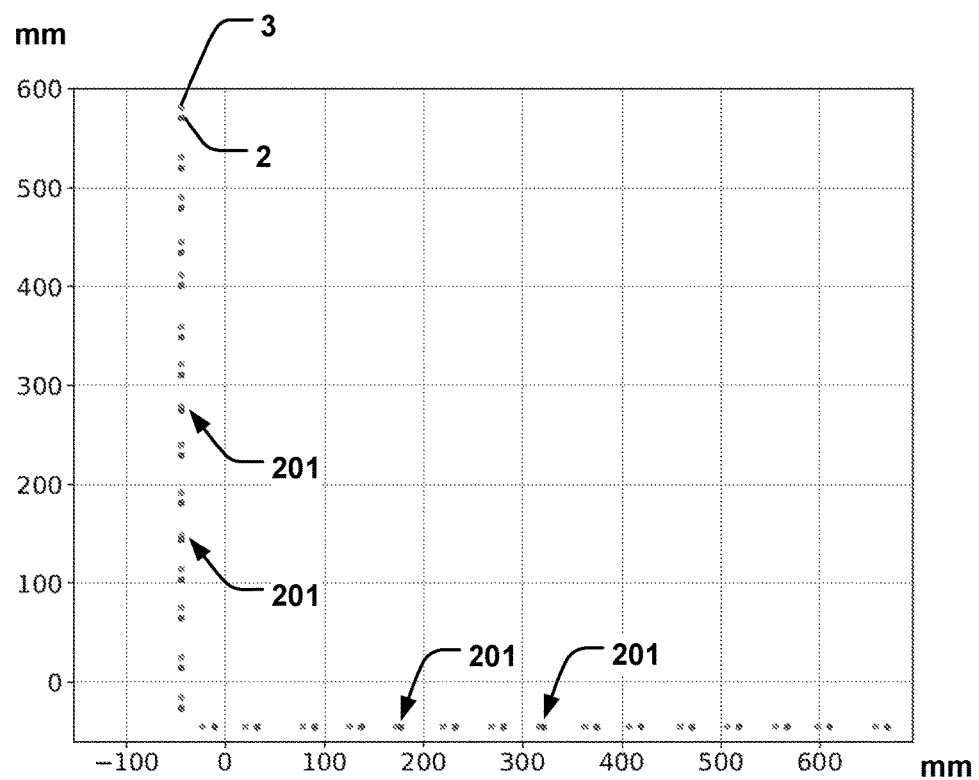
FIG. 7 is a schematic illustration of the positions of components along two perpendicular sides of at least part of a panel of a touch-sensitive apparatus, according to an example of the disclosure.

FIG. 7 shows a schematic top-down view of emitters 2 and detectors 3 arranged along perpendicular sides of a touch surface 4. The units of the x- and y-axes are in this example given in mm. The intra-group spacing ($S_c$) may in this example thus be viewed as the distance between an adjacent emitter-detector pair 2,3 in a group, and the inter-group spacing ($S_g$) as the distance between these groups. Both the intra-group spacing ($S_c$) and the inter-group spacing ($S_g$) has been optimized to minimize the spacing between the transmission paths (D) along the center line (C) as previously discussed. Thus, varying both the intra-group spacing ($S_c$) and the inter-group spacing ($S_g$) provides for a further increasing the resolution of the touch-sensitive apparatus 100.

The ratio of the inter-group spacing to the intra-group spacing may be 1.33. This may provide for a particularly effective minimization of the spacing between the transmission paths (D) along the center line (C).

The intra-group spacing in at least one group, in at least one of the first and second subsets, may be in the range 0.25-5 mm. This may also advantageously provide for reducing the size of any gaps in the grid of transmission paths (P) at the center line (C).

Figure 8:
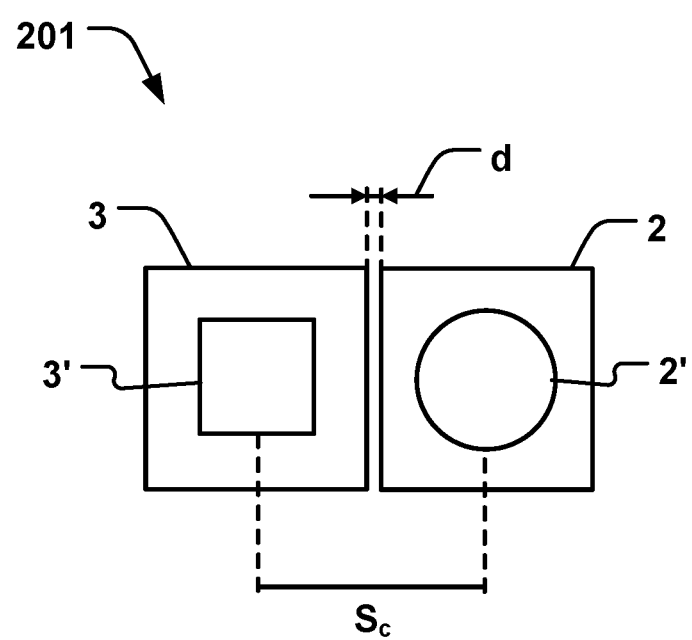
FIG. 8 is a schematic illustration of an emitter and a detector arranged with an intra-group spacing, in a detailed view, according to an example of the disclosure.

At least one emitter 2 and one detector 3, in at least one of the first and second subsets, may be arranged as a component pair 201 having an intra-group spacing ($S_c$) corresponding substantially to the sum of half the width of said one emitter 2 and half the width of said one detector 3. Thus, the emitter 2 and detector 3 in such component pair may be positioned as close as physically possible, while taking into account any manufacturing tolerances (d), as schematically illustrated in FIG. 8. The intra-group spacing ($S_c$), which effectively is the spacing between the active areas 2', 3', of the respective components 2, 3, may thus be minimized in order to further reduce the spacing between the transmission paths (D) along the center line (C).

At least one of the first and second subsets may comprise a plurality of the mentioned component pairs 201 arranged at defined intervals along the first and/or second end. The component pairs 201 may for example be arranged along the ends, i.e. sides of the touch-sensitive panel 4, with intervals as shown in FIG. 7 for providing an effective reduction of the spacing between the transmission paths (D) along the center line (C). As mentioned, the inter-group spacing ($S_g$) may be simultaneously varied.

The components within a group (G) may be separated with at least two different intra-group spacings ($S_c$). This is schematically illustrated in FIG. 6b, showing two different intra-group spacings $S_c$ and $S'_c$ for group G. The configuration illustrated in FIG. 6b may be referred to as a double-interleaved configuration. I.e. two detectors may be connected to function as one detector unit (3"), and two emitters may be connected to function as one emitter unit (2"). The detector- and emitter unit may be part of a group (G) as illustrated. Arranging the components within this group to have at least two different intra-group spacings ($S_c$) provides for reducing the spacing between the transmission paths (D) along the center line (C) while benefiting from the double-interleaved configuration. The configuration in FIG. 6b is just one example, and it is conceivable that number and type of component varies within each group, while the intra-group spacings ($S_c$) may assume a plurality of different values amongst the components.

Each detector 3 within a group may be separated by different intra-group spacings ($S_c$) from at least two emitters 2 in the same group, i.e. as illustrated in the example of FIG. 6b.

The groups may comprise interleaved pairs 2", 3", of detectors and emitters. For at least a first group, a detector 3 of at least one detector pair 3" and an emitter 2 of at least one emitter pair 2" may be arranged as a component pair 201 having an intra-group spacing ($S_c$) corresponding substantially to the sum of half the width of said one emitter 2 and half the width of said one detector 3. Hence, emitter and detector 2, 3, separated by spacing $S'_c$ as illustrated in FIG. 6b, may be arranged as previously described in relation to FIG. 8. Each group (G) in such double-interleaved configuration may comprise at least one component pair 201 having a separation corresponding substantially to the sum of half the width of said one emitter 2 and half the width of said one detector 3. This provides for a further effective reduction of the spacing between the transmission paths (D) along the center line (C).

As used herein, "horizontal" and "vertical" merely refer to directions on the drawings and does not imply any particular positioning of the panel 1.

The inventive grouping may thus be applied in one or both dimensions (horizontal or vertical) of the panel. It is to be noted that the inventive grouping of components may be applied in combination with any type of conventional arrangement of components, be it based on fan beams or collimated beams, as explained in the Background section. It is also conceivable that the inventive grouping is applied within only a portion of the opposite rows, while the rest of the opposite rows has a conventional arrangement of emitters and/or detectors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

Based on the present teachings, it is merely a matter of routine experimentation and optimization for the skilled person to design a systematic arrangement of the electro-optical components into spatially separated groups so as to achieve a desired property of overall detection grid, with respect to the spacing of intersection points along the center line, the uniformity of the intersection points across the entire touch surface, the average number of detection lines per intersection point on the center line, etc.

For example, the groups may contain more than two electro-optical components. It is even possible to use more than one type of group on either side, e.g. with respect to the number of components or the order of emitters and detectors. Furthermore, it is conceivable to use different groupings on the opposite sides, with respect to inter-group spacing, intra-group spacing, number of components in each group, etc.

Furthermore, all the above embodiments, examples, variants and alternatives given with respect to an FTIR-based touch system are equally applicable to a touch-sensitive apparatus that operates by transmission of other energy than light. In one example, the touch surface may be implemented as an electrically conductive panel, the emitters and detectors may be electrodes that couple electric currents into and out of the panel, and the output signal may be indicative of the resistance/impedance of the panel on the individual detection lines. In another example, the touch surface may include a material acting as a dielectric, the emitters and detectors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the detectors may be vibration sensors (e.g. acoustic or piezoelectric sensors).

What is claimed is:

1. A touch-sensitive apparatus, comprising
a panel defining a touch surface,
a first subset of components on a first end of the touch surface, and
a second subset of components on a second end of the touch surface,
wherein the components comprise emitters and detectors, the emitters being operable for propagating diverging light beams across the touch surface, and the detectors being operable for detecting transmitted light from the emitters,
wherein the components in at least one of the first and second subsets are systematically arranged in spatially separate groups along at least one of the first and second ends,
wherein each group comprises at least two components,
wherein said at least one of the first and second subsets have an inter-group spacing between the groups and an intra-group spacing between the components within each group, and
wherein the groups in said at least one of the first and second subsets have systematically varying inter-group spacing and systematically varying intra-group spacing.

2. The touch-sensitive apparatus of claim 1, wherein a ratio of the inter-group spacing to the intra-group spacing is greater than 1.2.

3. The touch-sensitive apparatus of claim 1, wherein a ratio of the inter-group spacing to the intra-group spacing is 1.33.

4. The touch-sensitive apparatus of claim 1, wherein the intra-group spacing in at least one group, in at least one of the first and second subsets, is in the range 0.25-5 mm.

5. The touch-sensitive apparatus of claim 1, wherein at least one emitter and one detector, in at least one of the first and second subsets, are arranged as a component pair having an intra-group spacing corresponding substantially to the sum of half the width of said one emitter and half the width of said one detector.

6. The touch-sensitive apparatus of claim 5, wherein at least one of the first and second subsets comprises a plurality of said component pairs arranged at defined intervals along the first and/or second end.

7. The touch-sensitive apparatus of claim 1, wherein the components within a group are separated with least two different intra-group spacings.

8. The touch-sensitive apparatus of claim 7, wherein each detector within a group is separated by different intra-group spacings from at least two emitters in the same group.

9. The touch-sensitive apparatus of claim 8, wherein the groups comprise interleaved pairs of detectors and emitters, and wherein, for at least a first group, a detector of at least one detector pair and an emitter of at least one emitter pair are arranged as a component pair having an intra-group spacing corresponding substantially to the sum of half the width of said one emitter and half the width of said one detector.

10. The touch-sensitive apparatus of claim 1, wherein the panel is rectangular with horizontal and vertical rows of said components,
wherein the components are systematically arranged in spatially separate groups in both the horizontal and vertical rows.

11. The touch-sensitive apparatus of claim 1, wherein the inter-group spacing on the first end is different from the inter-group spacing on the second end.

12. The touch-sensitive apparatus of claim 1, wherein the intra-group spacing on the first end is different from the intra-group spacing on the second end.

13. The touch-sensitive apparatus of claim 1, wherein the number of components in each group on the first end is different from the number of components in each group on the second end.

14. The touch-sensitive apparatus of claim 1, wherein each of the first and second subsets contains an alternating sequence of emitters and detectors.

15. The touch-sensitive apparatus of claim 1, wherein the components in both the first subset and the second subset are systematically arranged in spatially separate groups along the first and second ends.

16. The touch-sensitive apparatus of claim 15, wherein the groups in the first subset consists of a sequence of one emitter and one detector with respect to a reference direction along the first and second ends, and the groups in the second subset consists of a sequence of one detector and one emitter with respect to the reference direction.

17. The touch-sensitive apparatus of claim 1, wherein the first subset contains only emitters and the second subset contains only detectors.

18. The touch-sensitive apparatus of claim 1, wherein the first and second subsets define a grid of transmission paths (D) between the emitters and the detectors, wherein the groups are systematically arranged so as to generate a decreased spacing of transmission paths (D) along a center line (C) between the first and second ends compared to an equidistant arrangement of the components in the first and second subsets.

19. The touch-sensitive apparatus of claim 1, wherein the first and second subsets define transmission paths (D) between the emitters and the detectors, said transmission paths forming intersection points with a center line (C) between first and second ends, wherein the groups are systematically arranged so as to generate a decreased average number of transmission paths (D) per intersection point compared to an equidistant arrangement of the components in the first and second subsets.

20. A touch-sensitive apparatus, comprising:
a touch surface; and
a first plurality of components positioned on a first end of the touch surface, wherein the components include emitters and detectors;
wherein the first plurality of components are arranged in spatially separate groups along the first end,
wherein each group comprises at least two components, and
wherein an inter-group spacing between the groups is configured to systematically vary and wherein an intra-group spacing between the components of a respective group is configured to systematically vary.

* * * * *